United States Patent [19]

Vernon

[11] 4,094,027
[45] June 13, 1978

[54] INTERLOCKING TWO PIECE HULL FOR A CATAMARAN

[76] Inventor: Eugene G. Vernon, 2622 Crestview Dr., Newport Beach, Calif. 92105

[21] Appl. No.: 794,726

[22] Filed: May 9, 1977

[51] Int. Cl.² ............................................. B63B 5/24
[52] U.S. Cl. ................................................... 9/6 P
[58] Field of Search .................. 9/6 R, 6 P, 6 W, 6.5; 114/88, 85

[56] References Cited

U.S. PATENT DOCUMENTS

| | | | |
|---|---|---|---|
| 2,412,455 | 12/1946 | Hall, Jr. | 9/6 W |
| 3,315,284 | 4/1967 | Ludlow | 9/6 P |
| 3,648,310 | 3/1972 | Butler | 9/6 R |
| 3,811,141 | 5/1974 | Stoeberl | 9/6 P |
| 3,848,284 | 11/1974 | Livingston | 9/6 P |
| 4,021,874 | 5/1977 | Alter et al. | 9/6 P |

*Primary Examiner*—Trygve M. Blix
*Assistant Examiner*—Stuart M. Goldstein
*Attorney, Agent, or Firm*—W. Edward Johansen

[57] ABSTRACT

The invention is a molding process for forming a hull for a catamaran which has a sidewall that includes a first layer of fiberglass and polyester resin forming its exterior surface and a second layer of fiberglass and polyester resin forming its interior surface which is mechanically coupled to the first layer to form a structurally strong member. The hull includes a first member which forms the first portion of the hull, a second member which forms the second portion of the hull and a third member. The first member has a band adjacent to its peripheral edge that is indented to form a ledge. The second member has its first layer of the sidewall bent inwardly a slight amount adjacent to its peripheral edge in order that it may rest on the ledge of the first member and its second layer of the sidewall also adapted to rest on the ledge of the first member. The third member which is mechanically coupled to the second member adjacent to the bent peripheral edge on the interior surface of the sidewall and which is adapted to be mechanically coupled to the interior surface of the first member by glue secures the first member to the second member.

2 Claims, 3 Drawing Figures

INTERLOCKING TWO PIECE HULL FOR A CATAMARAN

This application is co-pending with my application Ser. No. 794,723, filed on May 9, 1977, and entitled "A Ribbed Inner Shell for a Hull of a Catamaran".

BACKGROUND OF THE INVENTION

1. Field of the Invention

The present invention relates to the construction of hulls for a catamaran and more particularly to a three piece molding process for making hulls that provides a smooth and secure joint where the top portion of the hull joins the bottom portion of the hull.

2. Description of the Prior Art

U.S. Pat. No. 3,971,837, entitled Process for Manufacturing a Composite Foamed Synthetic Resin Bowling Pin, issued to Tadashi Hasegawa on July 27, 1976, teaches a method of manufacturing a composite foamed synthetic resin bowling pin. The use of a foam material to provide structural strength to a plastic body is presently in common use in many sporting apparatus including its use in reinforcing the fiberglass hulls of a small catamaran.

U.S. Pat. No. 2,816,298, entitled Boat Construction, issued to Joseph F. Foster on Dec. 17, 1957, teaches a hull which includes an outer skin and an inner shell and which also includes a corrugated filler sheet positioned between the inner shell and the outer skin.

U.S. Pat. No. 4,021,874, entitled Boat Hull, issued to Hobart L. Alter and Peter L. V. Hutchinson on May 10, 1977, teaches a boat hull which is fabricated from synthetic plastic sheets. The main deck of the hull is separately vacuum-formed. Plastic foam is adhered onto the interior surfaces of the sheets. The main body and hull are thereafter jointed along the gunwale.

U.S. Pat. No. 3,811,141, entitled Boat Hull and Deck Assembly, issued to Helmut Stoeberl on May 21, 1974, teaches plastic boat hulls which are connected to the deck through nested inter-fitting tongue and groove joint configurations which are bonded together. U.S. Pat. No. 3,648,310, entitled Boat Structure, issued to Frank W. Butler on Mar. 14, 1972, teaches another boat structure which is useful in a dual hull boat arrangement and which has a pair of spaced hulls and a deck with a downwardly depending skirt which fits over the pair of spaced hulls.

The hulls of a catamaran are presently constructed in two pieces, one piece forming the top portion thereof and the other piece forming the bottom piece thereof. There is a mold for each piece. The molding process of each piece includes the steps of waxing the inner surface of the mold and coating the waxed surface with an acrylic paint. The molding process also includes the steps of placing a layer of fiberglass and polyester resin onto the waxed and coated surface so that the layer will bond and cure to the coating of acrylic paint, once the layer has bonded to the coating and has cured, placing a layer of foam material coated with a polyester resin on the layer of fiberglass and polyester resin, and pressing these two layer together by a vacuum technique. A vacuum system pulls the foam material against the inner surface of the layer of fiberglass and polyester resin. The molding process further includes the step of placing another layer of fiberglass and polyester resin onto the layer of foam material. Once this layer has bonded to the layer of foam material and has cured, the mold is removed and one of the portions of the hull is ready for assembly.

When both the top portion and the bottom portion of the hull have been formed they are joined together along their peripheral edges and secured by epoxy to each other. The joint formed where these two portions joined is structurally weaker than the sidewalls of hulls because there is no continuity in the layer of foam material and there is no interlocking between the edges of the two portions of the hull. Furthermore the joint does not effect a smooth surface. In addition to the problem of structural weakness, there is another problem in that the peripheral edges of the two portions of the hull must be aligned in order to effect a joint that is as smooth as possible. This is a problem where the two portions of the hull are mass-produced each in one place and assembled in still another place. Both of these problems are results of the method used to mold each portion of the hull which produces a relatively thick sidewall and the method of joining the two portions of the hull which necessitate an alignment thereof.

The inventor has developed two methods for molding the portions of a hull for a catamaran. The methods in and of themselves are useful in that each solves one of the abovementioned problems.

SUMMARY OF THE INVENTION

In view of the foregoing factors and conditions characteristic of the prior art the primary object of the present invention is to provide a method for fabricating a hull for catamaran which has sufficient structural strength where the two portions of the hull are joined.

It is another object of the present invention to provide a method for fabricating a hull for a catamaran which provides a smooth surface along the exterior surface of the hull where the two portions of the hull are joined.

It is still another object of the present invention to provide a method for fabricating a hull for a catamaran which eliminates the difficulty in aligning the peripheral edges of the two portions of the hulls.

It is yet another object of the present invention to provide a method for fabricating a hull for a catamaran which provides more protection against leaking at the joint where the two portions of the hull are joined than the prior art method of fabricating a hull does.

In accordance with an embodiment of the present invention a hull for a catamaran which has a sidewall that includes a first layer of fiberglass and polyester resin forming its exterior surface and a second layer of fiberglass and polyester resin forming its interior surface which is mechanically coupled to its first layer to form a structurally strong member includes a first member which forms the first portion of the hull, a second member which forms the second portion of the hull and a third member. The first member has a band adjacent to its peripheral edge that is indented to form a ledge. The second member has its first layer of the sidewall bent inwardly a slight amount adjacent to its peripheral edge in order that it may rest on the ledge of the first member and its second layer is adapted to rest on the ledge of the first member so that its exterior surface is flush with the exterior surface of the first member. The third member is mechanically coupled to the second member adjacent to the bent peripheral edge on the interior surface of the sidewall and it is adapted to be mechanically coupled to the interior surface of the sidewall of the first member and to be secured thereto by a polyester glue.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
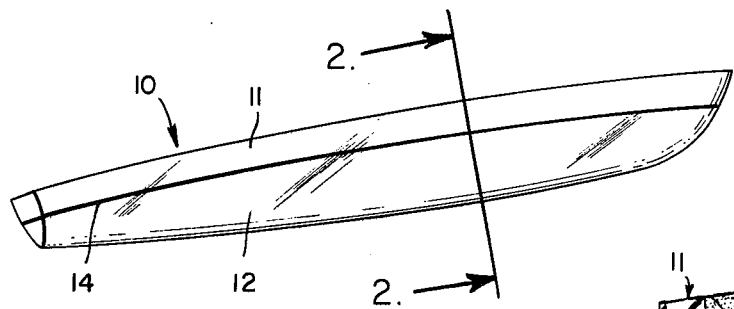
FIG. 1 is a perspective drawing of the hull of a catamaran which is constructed in accordance with the principles of the present invention.

In order to best understand the present invention a description of the preferred embodiment thereof is provided accompanied by a drawing. In FIG. 1 a perspective view of a hull 10 for a catamaran is shown. The hull 10 has a top portion 11 and a bottom portion 12 which are mechanically coupled together to form an air-tight and water-tight hull 10. The hull also includes a strip of tape 14 that runs along the surface of the hull 10 adjacent to the joint where the top portion 11 and the bottom portion 12 are joined.

Figure 2:
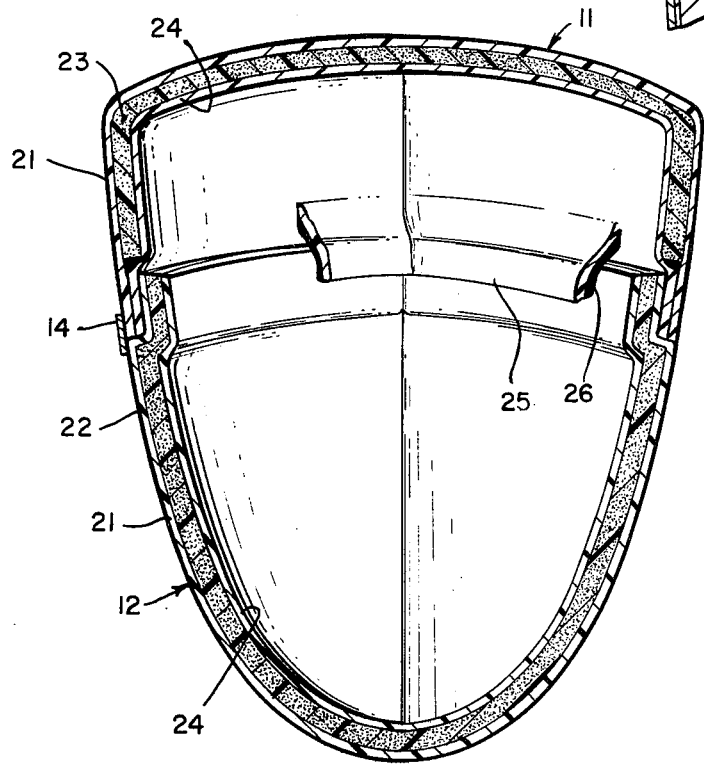
FIG. 2 is a cross-sectional view of the hull of FIG. 1 taken along line 2—2.

In FIG. 2 a cross-sectional view of the hull 10 of FIG. 1 is shown. The strip of tape 14 is more clearly shown in this figure than in FIG. 1 and is seen to cover the joint between the top portion 11 and the bottom portion 12 of the hull 10. The sidewall of the top and bottom portions 11 and 12 has a coat 21 of polyester paint. The sidewall includes a first layer 22 of fiberglass and polyester resin, a layer 23 of foam material and a second layer 24 of fiberglass and polyester resin. The layer 23 of foam material is glued to both the first and second layers 22 and 24 to provide a structurally strong member for both the top portion 11 and the bottom portion 12. A third member 25 is mechanically coupled to the interior surface of the second layer 24 of the top portion 11 adjacent to the peripheral edge thereof. The third member is adapted to be mechanically coupled to the bottom portion 12 adjacent to its peripheral edge on its interior surface. The third member 25 is secured to the bottom portion 12 by a polyester glue 26.

Still referring to FIG. 2 the bottom portion 12 has a band adjacent to its peripheral edge that has its first layer 22 and its second layer 24 indented in order to provide a ledge. The top portion 11 has a similar band also adjacent to its peripheral edge that has its first layer 22 bent slightly inward in order that it may rest on the ledge, its layer 23 of foam material missing adjacent to this band and its second layer 24 joined to its first layer 22 adjacent to the band. The band of the top portion 11 interlocks with the band of the bottom portion 12 and the third member 25 provides further alignment and securement. The exterior surface of the bottom portion 12 has polyester glue coating the exterior surface of its first layer 22 adjacent to the band. The band of the top portion 11 has polyester glue coating the interior surface of its second layer 24 adjacent to the band which is glued to the band of the bottom portion 12 to form an air-tight and water-tight hull 10. The third member 25 is adapted to provide structural strength at the joint where the top portion 11 and the bottom portion 12 are joined together.

Figure 3:
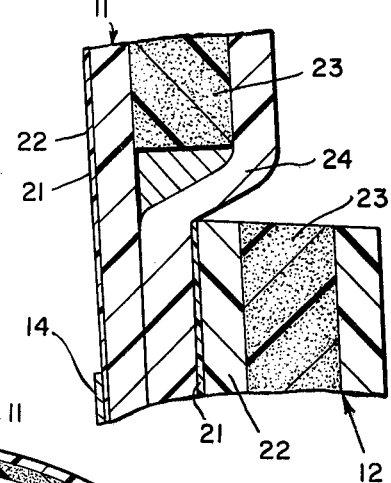
FIG. 3 is an enlarged partial cross-sectional view of the hull of FIG. 1.

Referring now to FIG. 3 an enlarged cross-sectional view of the hull 10 of FIG. 1 is shown. The removal of the layer 23 of foam material adjacent to the band of the top portion is more clearly shown.

The method of molding this hull 10 is to use a three piece mold and produce the top portion 11 and the bottom portion 12 with a ledge adjacent to the band formed by the third piece of the mold in conjunction with the second piece. The advantages of the present invention is that because the top portion 11 and the bottom portion 12 are joined along thier respective band adjacent to their peripheral edges the alignment of these peripheral edges is not as critical as it has been in the prior art method of fabricating these types of hulls. Furthermore the larger gluing surface of the bands insures that the hull 10 will be structurally strong at the joint where the two portions 11 and 12 are joined and that the hull 10 will be air-tight and water-tight.

From the foregoing it can be seen that a method for fabricating a hull for a catamaran that is not only structurally strong, but is also adapted to be mass-produced because of the self-aligning of the two portions has been described.

It should be noted that the schematics of the molding process and hull are not drawn to scale and that distances of and between the figures are not to considered significant.

Accordingly, it is intended that the foregoing disclosure and showing made in the drawing shall be considered only as an illustration of the principles of the present invention.

What is claimed is:

1. A hull for a catamaran, comprising:
   a. a first member which has a sidewall that includes a first layer of fiberglass and polyester resin forming the exterior surface of said sidewall and a second layer of fiberglass and polyester resin forming the interior of said sidewall which is mechanically coupled to the first layer to form a structurally strong member, said first member having a band adjacent to its peripheral edge that is indented to form a ledge;
   b. a second member which has a substantially vertical sidewall that includes a first layer of fiberglass and polyester resin forming the exterior surface of said sidewall and a second layer of fiberglass and polyester resin forming the interior of said sidewall which is mechanically coupled to the first layer to form a structurally strong member, said second member having the second layer of its said sidewall bent inwardly a slight amount adjacent to its peripheral edge in order that it may rest on said ledge of said first member along which it is joined, the first layer of said sidewall being adapted to rest directly on said ledge of said first member; and
   c. a third member which is mechanically coupled to said second member adjacent to its said peripheral edge along the interior surface of said vertical sidewall and which is adapted to be mechanically coupled to the interior surface of said first member and to be secured thereto by a glue.

2. A hull for a catamaran according to claim 1 wherein said hull also comprises a strip of tape which is disposed about said hull where said first and second members are join together.

* * * * *